Patented Nov. 25, 1952

2,619,425

UNITED STATES PATENT OFFICE 2,619,425

DRYING AND DEFATTING TISSUE

Ezra Levin, Champaign, Ill.

No Drawing. Application April 3, 1951,
Serial No. 219,126

21 Claims. (Cl. 99—208)

This invention relates to an improved method for the azeotropic drying of heat-sensitive, biological substances, with or without the simultaneous extraction therefrom of desirable components. More particularly, it relates to a method for simultaneously desiccating and defatting such substances which are in the form of pumpable liquids, either as true solutions, colloidal solutions, fluid emulsions or suspensions of fine solids.

In U. S. Patents Nos. 2,503,312 and 2,503,313 are described methods by which tissues and other biological substances may be simultaneously dehydrated and defatted by means of azeotropic distillation using a water immiscible fat solvent. The present invention comprises an improvement in conducting the basic processes described therein.

In U. S. No. 2,503,313 the operation is carried out below about 60° C. Proteins coagulate by heat at about 60° C. Moreover, many valuable components of tissues, for example, enzymes, are destroyed if the temperature is allowed to approach or exceed 60° C. Time and the presence of water are factors in the destruction of enzymes and the like. Thus enzymes in raw, wet tissue may be destroyed in a matter of minutes at 60–70° C. When, however, tissue containing enzymes is desiccated in a manner such that the enzymes are intact, the dried enzymes are relatively stable and will withstand temperatures of, say 70° C. for a considerable time without being destroyed. This is also true of certain other heat-sensitive components. The process of the patent is carried out at a sufficiently low temperature so that the biological substances remain in substantially unchanged condition except for the removal of fat and water, and may, to all intents and purposes, be considered raw.

In U. S. No. 2,503,312, a process is described in which the operation is carried out above 60° C. and below 100° C. The process involves procoagulation of comminuted particles of tissue prior to the dehydration and extraction so that the particles do not form large agglomerates or lumps. If such agglomerates form, they cannot be completely dehydrated or defatted due to the building up of a protective coating of dried material around the outside thereof.

In U. S. 2,539,544 is described an expedient by which coagulable material is first subjected to partial dehydration at a temperature below the coagulation point, followed by raising the temperature to the range of about 60 to 100°C. during which the principal dehydration and defatting occurs. This also prevents formation of agglomerates.

The processes described in these patents are intended to achieve somewhat different objectives, although all involve both dehydration and defatting and all are primarily concerned with the preservation of valuable food and therapeutic properties of the substance being treated. The lower temperature operation is conducted under vacuum and is necessarily more expensive than the higher temperature operation which is usually conducted at atmospheric pressure. For many purposes the complete preservation of all values present in the original biological substance does not justify the added cost of the use of vacuum. Consequently, for many purposes the higher temperature operation is satisfactory. This is particularly true with substances such as meat scrap; liver which is to be used largely for the anti-pernicious anemia factor and as a protein source; fish offal; stick water, and the like.

Operating difficulties arise with certain types of materials undergoing treatment. For example, the so-called stick water or fish solubles, from processing fish, when dehydrated by the processes described in the patents, results in deposition of the solids content as a gummy, adherent, mass in the apparatus. If it does not stick to the vessel, the material coalesces in large gummy masses that cannot be dried or defatted. This tends to accumulate so that heat transfer rates are greatly reduced. It can be removed from the apparatus only with great difficulty. A similar phenomenon is noted in the case of drying and defatting blood, serums, eggs, eggwhite, and other material that contains a sticky substance.

I have discovered that such materials can be injected into a body of boiling solvent in such a way that it disperses into minute droplets which, upon contact with the boiling solvent, instantly become partially or completely dehydrated, due to the azeotropic distillation of water from the particles. As a result, the particles no longer tend to coalesce to form large lumps of insufficiently treated materials, and likewise no longer stick to the apparatus being used. Instead the product ranges from a powder to salt-like granules which either subside in the liquid solvent layer or rise to the top, depending on the substance treated, and the exact mode of operation, as well as the density of the solvent.

I have also discovered that the process is highly advantageous in connection with the dehydration and defatting of normally solid tissues. Such tissues, for example, glands, may be subjected to extreme mechanical disintegration so as to produce a pumpable suspension or emulsion more or less homogeneous in character. This is in contrast to the method described in my foregoing patents wherein such tissues are ground to a rather small particle size before carrying out the major part of the operation.

The pumpable fluids or emulsions thus produced act, as do true solutions, in that they can be atomized or otherwise injected in the form of minute droplets into the boiling solvent. Dehydration and defatting are accomplished at a substantially more rapid rate than was possible heretofore.

Because dehydration is substantially instantaneous, or at most occurs in a matter of seconds, the dry product contains a higher percentage of the original heat-destructible components contained in the raw tissue than is the case when the material is permitted to reside in the apparatus for a period which may extend from some 30 minutes to several hours, during which time it undergoes progressive dehydration. The cost of processing by the new method is reduced, so that two objectives are attained; namely, improvement in product and processing economy.

The size of the droplets introduced into the solvent, that is, the degree of atomization, is related to the material being processed. Certain materials in the liquid or semi-liquid pumpable state can be added dropwise to the boiling solvent (when temperatures above 60° C. are used) because the material tends to coagulate rapidly upon contact with the vapor and liquid within the vessel and hence does not tend to agglomerate. Such materials include homogenized glandular tissues, such as liver, kidney, pancreas, etc.

On the other hand, substances such as stick water, produced either in the fishing industry or in the wet rendering of lard and the like, do not coagulate to any great extent and hence must be injected into the liquid in such a way as to form droplets so fine that they are substantially instantaneously dehydrated, at least to an extent such that they will no longer stick to one another or the apparatus. If added to the vessel in a large stream, it sinks to the bottom, coalesces, and builds up large lumps. These are hard and rock-like, and are only partially dehydrated. They cannot be further dehydrated or defatted by continued processing.

Liquids of this character must be injected either in atomized form, or else as fine jets directly into the boiling solvent so that the natural agitation of the boiling liquid breaks the jets into fine droplets.

It is highly advantageous to make the fluid, pumpable material into a pumpable emulsion or mixture with a portion of the solvent. As soon as the stream of such an emulsion is injected into the boiling solvent, the emulsion is broken. As a result, the biological substance in the form of droplets is substantially instantaneously dehydrated and defatted, at least to the extent that they cannot coalesce into lumps, or stick to the vessel. The product is obtained as granules which can be withdrawn from the system, rinsed to remove occluded fat and treated for removal of absorbed solvent in the manner described in the above referred to patents. This method has the further advantage that it offers a means for supplying to the system at least a part of the solvent which is being removed from the vessel due to the azeotropic distillation. It is especially advantageous with substances which are later to be reconstituted with water, such as serum, human blood, egg, egg albumen, etc.

The advantages of the azeotropic method for simultaneously dehydrating and defatting biological substances are fully set forth in the above-mentioned patents.

Among the substances which may be treated according to the present invention are stick water from fish processing or the wet rendering of fats, serum, eggs, eggwhite, various body fluids such as bile, blood, etc., naturally occurring or produced by pressing or other operations wherein such fluids are separated from tissue, etc. Among the specific substances which may be reduced to a fluid pumpable consistency are various glandular substances, for example, pancreas, liver, thyroid, stomach lining, intestinal mucosa, whole duodenum, kidney, kidney cortex, kidney medulla, spleen, whole blood, hemoglobin, blood plasma or serum, brain, heart, ovary, testes, lymph glands, mammary glands, thymus, pituitary gland, or the anterior and posterior parts separately, placenta, prostate, bladder, spinal cord, muscle, bone marrow, whole adrenals, adrenal cortex, adrenal medulla, salivary glands, corpus luteum, uterus, pineal, bile, parathyroid, intestines, fish entrails and glands including the pyloric caeca, etc.

In certain instances, glandular materials may be subjected to autolysis prior to being processed. This is often done to increase the available proportions of certain desirable constituents. For example, the enzyme trypsin in pancreas may be increased in concentration by activating the trypsinogen by autolysis for periods of time ranging from several hours to several days. These activations or digestion treatments to increase the active constituents are well known and need not be described in detail.

Certain of these substances can be reduced to a fluid pumpable consistency, for example, by passing them through a hammer mill. In some instances it is necessary to remove, for example by straining, tough tissues which might tend to clog jets or other atomizing equipment. Any suitable method of reducing the substances to the pumpable consistency may be used.

The solvents useful in this process are those which are substantially immiscible with water and which form azetropes with water boiling substantially below 100° C. at atmospheric pressure. The solvent selected should be capable of forming an azeotrope which will remove substantial proportions of water with relation to the amount of solvent distilled at the operating temperature selected. The proportion of water to solvent in an azeotrope at any given pressure varies considerably between solvents depending upon the molecular weight of the solvent and its vapor pressure at the azeotropic boiling temperature.

Among the solvents, ethylene dichloride is one of those preferred. Others include propylene dichloride, trichlorethylene, perchlorethylene and other low boiling chlorinated solvents. These may include the bromine, iodine or fluorine derivatives of aliphatic hydrocarbons. In general, the solvents should boil below about 120° C. under standard conditions. The hydrocarbon fat solvents, including benzene, hexene, hexane, toluene, cyclohexane, heptane and others, may be used. The solvent should not be reactive with the tissue constituents under the conditions of operation and should be capable of being removed by evaporation from the fat and from the solid products of the process without leaving harmful or toxic residues.

In general, the temperature of the process should not be permitted to exceed about 100° C. and is preferably maintained below about 90° C.

As previously indicated, the temperature is selected dependent upon the character, use and properties desired of the final product. When producing solid materials which are to contain substantially all of the original valuable properties of the raw tissue, with the exception of those of course which are soluble in fat, temperatures below 60° C. and preferably in the range of about 30 to 50° C. are used. At and above about 60° C. many of the enzymes, for example, are destroyed by heat. In order to attain the desired temperature, the pressure on the system is generally below about 300 millimeters of mercury and is preferably in the range of about 50 to 250 millimeters. When substances are to be recovered which have not been subjected to heat coagulation, for example, in producing dried albumen from eggwhite, temperatures below 60° are employed.

When coagulation of the protein offers no material disadvantage or where the preservation of all biologic values of the tissues is of no great importance, temperatures above 60° C. may be used. These operations are usually carried out at or about atmospheric pressure. Thus, when a substance is to be used largely for its protein content, either as human or animal food, and as such has a relatively low selling price, the process is generally operated at atmospheric pressure and at a temperature of about 60 to 100° C.

In general, all but about 1 to 5% of the water is removed from the tissue, this depending upon factors largely concerned with the properties desired in the final product. In certain instances the dried product may contain a small proportion of fat of the order of 1 to 2% where this is not objectionable. The fat remaining in the desiccated tissue is occluded fat and the ultimate proportion present depends to a large extent upon how thoroughly the dried powder is rinsed after the principal dehydration and defatting has occurred. It will be realized, of course, that at the time the dehydration is complete, the powder is suspended in solvent rich in fat. The rich solvent is removed from the powder by draining or filtration, but a certain amount of the mixture of solvent and fat is entrained by the powder and can only be removed by rinsing.

The process may be carried out on a continuous, semicontinuous, or batch basis. It can be carried out in a single stage or in several stages.

In general, as above described, the liquid or fluid pumpable material is atomized or sprayed into a body of boiling solvent. In some instances, the material may be sprayed or otherwise atomized into the vapor space above the boiling solvent. It is generally preferable, however, to inject the fluids directly into a relatively large body of boiling solvent, and below the surface thereof. It is preferred to do this near the top of the boiling body of solvent where the desiccated solids are heavier than the solvent and sink. In certain instances where the dried solids rise, the spray is injected at or near the bottom of the solvent pool.

When carrying out the process on a continuous basis, a vertical vessel or tower may be provided. This may have, for example, baffles of the well known side to side type which slope inwardly and downwardly in overlapping relationship, although this is generally not necessary. The vessel may be provided with heating means, either external or internal, for example, closed coils for carrying steam or other heat transfer media may be provided throughout the length of the vessel or at any appropriate point or points along its length.

The vessel is also provided with a vapor line and condensers, receivers and separators. An inlet and spray jet or other atomizing device is likewise provided. Among these are various types of spray or jet nozzles or in certain instances a high speed rotating disk may be provided just above the liquid level, the fluid material being dropped upon the disk and broken into fine particles as it is thrown from the disk by centrifugal force.

In carrying out the operation in such a device, the vessel is filled with solvent and is heated until the solvent boils violently. There should be a substantial pool of liquid solvent above the topmost baffle in the column. The fluid material is atomized into this part of the solvent. As the droplets encounter the solvent, they are instantly partially or completely dehydrated, the water being removed overhead through the vapor line as an azeotrope with the solvent. The vapors are condensed, the water layer is separated, and the solvent may be passed to storage or returned to the system. Solvent is furnished to the vessel continuously to replace that removed in the distillation.

The partially or completely dehydrated particles fall through the solvent in the vessel. Dehydration and defatting continues during the passage of the particles downwardly through the solvent. If baffles are used, the sloping surfaces should be at such an angle as to prevent collection and retention of solids in the system. The solids settle to the bottom of the tower and can be withdrawn continuously as a slurry in the fat laden solvent. The solvent is drained from the solid material which is then rinsed with fresh solvent to remove occluded fat. The fat laden solvent is subjected to distillation to remove all solvent in a manner described in the above mentioned patents. When the dried solids tend to rise, a vertical tower without baffles is generally used. The pumpable mixture is injected near the bottom of the tower and a suspension of solids in solvent is withdrawn near the top surface of the boiling solvent. Whether the solids are rising or settling in the boiling liquid, the fresh solvent or the wash liquid from the withdrawn solids may be introduced at the top or the bottom of the tower and the fat-rich solvent may be withdrawn at the other end, or the liquids may be introduced or withdrawn at various points of the tower, all depending on the design of the equipment, location of heating, density and temperature of the materials and mixtures, and the results desired.

It is advantageous when employing a continuous process, such as that just described, to return substantially water free solvent vapors from the recovery step, either directly or after being superheated, to appropriate points in the tower. This not only furnishes additional solvent, but supplies heat to the system to maintain the solvent in boiling condition. This method has the advantage of saving in heating and also in cooling water necessary to condense the vaporized solvent recovered from the fat. Solvent vapors may be generated for sparging into the boiling liquid solvent, for heating purposes in lieu of part or all of the indirect steam heating.

The solvent-free fat is often an extremely valuable product, in some instances containing high proportions of fat soluble vitamins. In other instances, the fat may be of value for industrial or edible purposes, either with or without refining, depending upon the requirements of the use to which it is to be put.

A variation of the continuous method just described in connection with solids that sink, comprises providing the tower with a solids-collection leg. This may be a heated or unheated section, generally of smaller diameter than the main tower. The solids collect in the leg and may be withdrawn therefrom. Means for removing slurries of solids from vessels are known. Fresh liquid solvent may be introduced into the bottom of the leg passing upwardly into the main body of solvent in the extraction-distillation tower. This has the advantage of removing occluded fat and takes the place of the rinsing step referred to above. When this is done, a portion of the enriched solvent is withdrawn from a point near the top of the tower and taken to the solvent separation step above referred to.

This continuous procedure insures a maximum efficiency of dehydration and defatting with a minimum residence time of the solids. Labor requirements are reduced; control is simplified; smaller equipment is required to handle a given daily capacity; there is more efficient use of and absence of peak loads for steam used in heating, for power and for cooling water; and there is a substantial reduction of solvent losses, over batch operations.

As a variation, a semi-continuous process may be employed in which the atomized droplets are partially dehydrated in the first step and are withdrawn as a slurry suspended in the solvent to a vessel wherein the dehydration and defatting are continued until complete. The solids may be permitted to accumulate in this vessel until it is full, after which the slurry is switched to a companion vessel. The first vessel is then emptied, the solids being treated to remove occluded fat and solvent and the fat enriched solvent is treated to evaporate and recover the solvent therefrom.

In a batch operation, the solvent may be brought to the boiling point at the temperature selected and the fluid material sprayed into the body of boiling solvent as previously described, the operation continuing until dehydration and defatting is complete. The solids are allowed to accumulate until the vessel is substantially full at which point the feed of fluid biological material is discontinued. The distillation is continued for a short interval to dehydrate the last charged material, after which the vessel is emptied and the products are treated in the manner indicated heretofore.

This process is also useful for treating certain biological substances to dry and simultaneously extract certain components other than fat. These may include components soluble in such solvents as alcohols, ketones, esters and the like, which may be partially or completely water-soluble. These solvents must be capable of forming azeotropes boiling below 100° C. at the pressures used. In some instances, no fat is removed. While in others, the fat is partially removed, along with the other desired component. Where the solids dried and extracted in this manner contain fat, this can be removed by simple extraction of the solid with a fat solvent.

Some of the substances which may be treated according to this method do not contain appreciable proportions of fat. For example, a fat containing substance may be dessicated and defatted as earlier described. The dried substance may then be extracted with water, or water containing another solvent to remove certain values, e. g. water soluble vitamins mixed with other soluble substances. The clear liquor produced must then be dried. A suitable azeotrope forming solvent is selected for one of the dissolved components, and the drying-extraction step is carried out by atomizing the solution into boiling solvent. The desired values dissolve in the solvent while water is simultaneously removed as an azeotrope. The dried residue is separated, rinsed with fresh solvent, and occluded solvent evaporated therefrom. The extracted material is recovered from the solvent by known means.

It is apparent that the process of this invention can be used to dry aqueous solutions, emulsions or suspensions of biological substances in which nothing is extracted by the azeotrope former. The advantage lies in the ease and rapidity of drying, the production of fine particles, the ready control of drying temperature to avoid heat damage, and the low processing costs.

The following examples are intended to illustrate the process and are not to be considered as limiting the invention to the exact materials or procedural conditions described.

*Example I*

Pancreas from a freshly killed animal was passed through a hammer mill in which it was reduced to a fluid of pumpable consistency. A distillation vessel about sixty-five percent full of boiling ethylene dichloride was provided. The homogenized fluid was immediately pumped under pressure through spray jets into the ethylene dichloride at a point just below the surface. The pressure on the vessel was approximately 215 mm. of mercury. The vessel was provided with closed heating coils to supply heat required to carry out the process. The temperature of the boiling liquid was about 40° C. The body of solvent was kept boiling vigorously. The vessel contained about 800 gallons of ethylene dichloride and the emulsion was added at a rate of about 100 gallons per hour. The particles were found to remain discrete and to gradually settle to the bottom of the vessel as dehydration and defatting became complete. Fresh solvent was added in an amount sufficient to replace solvent removed as an azeotrope with water and to maintain the level in the vessel at substantially the original point. An excess of solvent over that to completely dissolve the fat in the pancreas was maintained at all times. When the layer of solids had accumulated to about half the volume of the vessel, the charge of fluid was discontinued. The distillation was continued for about 10 minutes to remove water from that substance added near the end of the run. The rich solvent was then drained from the solids in the vessel. Fresh warm solvent was then passed through the solids to rinse off occluded fat. The solids were then removed from the vessel and the adsorbed solvent was evaporated therefrom. The pancreas powder thus obtained was non-hygroscopic and was found to be exceedingly rich in enzymes having approximately the properties described in U. S. 2,503,313, Example I. The processing cost was substantially reduced over the operation described in the patent.

*Example II*

A continuous operation using pancreas prepared as described in Example I, was carried out substantially as described above. In this operation, as in the one described in Example I, the temperature did not exceed 40° C. at any stage of the drying and defatting. Ethylene dichloride was used as the solvent. Operating costs were less than in Example I. The continuous and simultaneous drying and defatting of homogenized intestinal mucosa, gastric mucosa, kidney, spleen, pituitary, thymus and liver produce comparable benefits. Other fat solvents, such as trichloroethylene and hexane, produce excellent results.

*Example III*

Stick water or fish solubles are produced in the hydraulic extraction of oil from fish. In conventional commercial practice, stick water is evaporated to a molasses-like consistency in multiple effect evaporators which is shipped in tank cars to manufacturers of compounded animal feeds. It contains 40–60% water. This, of course, adds substantially to freight costs. Moreover, condensed stick water contains varying quantities of fish oil which has a value in itself and is considered a detriment due to its tendency to become rancid and build up in concentration of free fatty acids. No practical method has heretofore been devised for removing this fat from the stick water concentrate.

The stick water as produced was subjected to dehydration and defatting by the present process, using atmospheric pressure, a temperature of 71° C., and employing ethylene dichloride as the solvent. A highly desirable solid granular product was produced which was free of objectionable oil and with the food values thereof unimpaired. Stick water contains substantial proportions of vitamin $B_{12}$ and is a highly desirable source of this essential vitamin for animal feed. In the present product, the vitamin $B_{12}$ content was unimpaired and the power was non-hygroscopic. It was substantially free of fatty oils.

When stick water was evaporated to solid state on drum dryers, the vitamin $B_{12}$ content had been materially reduced and the food value of the remaining solids was seriously impaired. The material was scorched and highly hygroscopic. It contained about 10% of oil.

The preferred method for treating stick water by my process is to evaporate the solution as has been heretofore done to a solids content of about 40 to 60% and to spray the resulting viscous material beneath the surface of boiling solvent as hereinbefore described. A highly desirable solid product in granular form is thus produced, there being no impairment of the vitamin $B_{12}$ or food values. It is a desirable adjunct to various animal food mixtures. The material is non-hygroscopic, which is a great advantage in that the material can be shipped in bags. The saving in shipping cost over the concentrates heretofore used far exceeded the cost of processing in this manner.

It is also advantageous to emulsify the stick water concentrate in a portion of the ethylene dichloride. The resulting solids are more uniform in size of particles than when the unemulsified stick water is sprayed into the solvent.

*Example IV*

The advantage of the present process is demonstrated by the following described experiment wherein the material was not sprayed into the boiling solvent.

In a batch operation, solvent and stick water in the ratio of 5:1 were placed in a suitable vessel of semi-commercial proportions. The mixture was added at atmospheric pressure and heated until distillation proceeded in the manner described for glandular substances in U. S. Patent No. 2,503,312. When dehydration and defatting were complete, it was found that a major portion of the solids had deposited over the sides of the vessel and on agitator blades and could be removed only with the greatest difficulty. In fact, it was necessary to use a hammer and chisel to break the material loose from the apparatus. The properties of the product were good, but the extra labor and difficulties employed made it impractical of use from a commercial standpoint. As will be observed from the foregoing Example III, this difficulty is obviated by the process of this invention which makes the production of a dry, defatted powder from stick water commercially practical for the first time.

*Example V*

Beef blood was dried at atmospheric pressure and a temperature of about 71° C. using ethylene dichloride as the solvent. The blood was emulsified with cold ethylene dichloride and was injected as spray below the surface of boiling liquid solvent in a batch operation, the dried, defatted blood being permitted to accumulate in the vessel. The properties of the product were excellent, both as to food and for other values contained therein. It was far better than the dried blood of commerce which is produced by conventional drying methods. Blood, like stick water, is found to form gummy, sticky masses when the process is carried out in the manner described in Example IV. The present method makes it possible to conduct that process using dried blood or stick water on a practical commercial basis.

Fresh blood is dehydrated and defatted by this process at 38° C. and can be reconstituted by adding saline solution. The reconstituted blood has the clotting properties of fresh blood. It can be treated in the usual manner to prevent clotting. The adaptation of the process to the preservation of whole human blood for transfusion purposes becomes apparent. Suitable buffers and anticoagulants can be added before drying, so that only water need be added before use. Removal of the fat insures long term stability of the powder. By using the emulsion technique described herein, a very fine powder can be produced which can be readily and quickly reconstituted.

*Example VI*

Egg albumen was emulsified with equal proportions of ethylene dichloride. It was injected into boiling ethylene dichloride in the manner described in Example I. A white powdered albumen was obtained which could be reconstituted for various uses, including food. Eggwhite, as dried blood and stick water, also sticks to the sides of the vessels, under conditions of Example IV, making a batch operation wherein all of the egg is introduced at the beginning of the run, impractical.

*Example VII*

Whole egg was emulsified with solvent as described in the foregoing example. It was simultaneously dried and defatted at atmospheric pressure and 71° C. in the manner described in Example III. Ethylene dichloride was the solvent. A fine, defatted powder was obtained which could be readily reconstituted and used for the purposes for which egg powder heretofore has been used. The flavor of the material when made into an omelet was far superior to that produced by conventional spray-drying operations. Since the fat has been removed, its keeping qualities, especially with respect to flavor, are greatly improved.

Other solvents, such as hexane, benzene, perchlorethylene, and the like, have been used successfully in carrying out the dehydration and defatting of the foregoing substances. Moreover, other substances, such as those set forth earlier in the specification, have been successfully dehydrated and defatted by these processes.

Example VIII

Whole cheese whey was concentrated in multiple stage evaporators to a solids content of about 50%. The viscous concentrate was sprayed into boiling ethylene dichloride as described in Example III. The powdered, defatted solid produced was found to have its vitamin content and other nutritional factors unimpaired. It was non-hygroscopic.

Conventional drum drying of whey results in partial decomposition of protein, rendering the solids hygroscopic unless great care is taken to avoid overheating. The sugars present, largely lactose, caramelize readily, although this does not occur in the present process.

Example IX

Buttermilk was dried and defatted as described in Example VIII. The properties of the dried product were excellent. The keeping properties of both whey and buttermilk produced by this process are excellent. The nutritional factors which make condensed whey and buttermilk such desirable poultry and animal feeds were preserved. The dried materials can be shipped in bags. The container costs for shipping condensed products are often as much or more than the value of the product. The economy of using paper bags over expensive rigid containers is immediately apparent, to say nothing about savings in freight because of the removal of water. The keeping qualities are greatly improved. The dried products can be mixed with grain and other animal or poultry feeds to produce balanced rations, either by the consumer or by compounders of such feeds. The resulting mix can be moistened with water before use if desired.

It should be pointed out that while some of the substances which may advantageously be dried by the present process can be dried by conventional spray drying, others cannot at least from a practical standpoint without destruction of valuable properties. In conventional spray drying, the substance is subjected to a very high temperature for a short time, but with heat destruction of valuable heat sensitive constituents. Others can be lyophilized, but the time factor is excessively permitting some loss of valuable constituents by autolysis, etc.

The present invention possesses the advantage of the short time of conventional spray drying with the advantages of low temperature, so that a superior product results. Moreover, the cost is less, for example, in drying condensed fish solubles.

Certain materials, such as whole blood, cannot be dried by any known process. Destruction of the cells results. By the process of this invention, using a temperature of say 37° C., the cells of the blood are not destroyed, and as previously mentioned, the blood solids can be reconstituted.

The process may conveniently be referred to as "solvent flash drying."

Example X

Inedible, infertile eggs from hatcheries were separated into the whites and yolks. The whites were emulsified with ethylene dichloride and sprayed into boiling ethylene dichloride maintained under a vacuum so the temperature was about 50° C., this being below the coagulation temperature. The resulting azeotropically dried albumen was a clear white, substantially odorless powder, which could be reconstituted by adding water and used for many purposes, such as in adhesives, emulsifying agents, etc.

The yolks were similarly defatted and dehydrated with a boiling mixture of equal parts ethyl alcohol and ethylene dichloride. All of the lecithin and cholesterol was removed in this way. The fat could be bleached by known methods and white lecithin and cholesterol recovered. The solid powdered residue from the treatment could be used in animal feed for its protein and other values. It, too, was substantially odorless.

For substances which are difficult to emulsify or cannot be emulsified in any other way with the solvent chosen, an emulsifying agent may be used. When the product is for human consumption, an edible emulsifying agent may be used. This may take the form of an added oil, such as corn oil, peanut oil and oil of animal origin, and includes using a portion of the oil extracted from the material being dried and defatted. For example, a portion of the fat-enriched solvent may be mixed with fresh solvent and an emulsion of the tissue or other biological material formed. Other types of emulsifiers known to those skilled in the art may be used. If the products are to be used for industrial purposes, non-fatty emulsifiers, of which many are known, may be employed.

I claim:

1. In a process for drying and defatting a biological substance which comprises simultaneously defatting and drying by azeotropic distillation of water from said substance, using a water-immiscible fat solvent, and maintaining a temperature below 100° C., the improvement comprising converting said substance into fluid pumpable form, then introducing said fluid substance in the form of droplets into a boiling body of said solvent, removing the water from said substance in the form of an azeotrope with said solvent, and recovering the dry, defatted substance.

2. The process of claim 1, further characterized in that desiccated, defatted substance is continuously removed from said body of boiling solvent, fat enriched solvent is continuously withdrawn, and additional solvent is continuously added to replace (a) solvent withdrawn with the dried substance as well as (b) solvent removed during azeotropic distillation, and (c) the fat rich solvent withdrawn from the system.

3. The process of claim 1, further characterized in that the original biological substance is introduced into said boiling solvent as an emulsion in fresh solvent.

4. The process of claim 1 wherein the biological substance is stick water.

5. The process of claim 1 wherein the biological substance is blood.

6. The process of claim 1 wherein the biological substance is a serum.

7. The process of claim 1 wherein the biological substance is egg.

8. The process of claim 1 wherein the biological substance is egg white.

9. The process of claim 1 wherein the biological substance is a normally solid tissue which has been reduced by mechanical disintegration to a pumpable consistency.

10. The process of claim 1 wherein the temperature is maintained below about 60° C.

11. The process of claim 1 wherein the temperature is maintained between about 60° C. and about 100° C.

12. A process for drying a biological substance which comprises converting said substance into a pumpable fluid form, thereafter continuously introducing it in the form of droplets into a body of an azeotrope former in a distillation zone, maintaining said body of azeotrope former in boiling condition at all times, removing the azeotrope formed and recovering the dried powdered biological substance, the temperature being maintained at all times below 100° C.

13. A process for drying and simultaneously extracting valuable constituents from biological substances which comprises converting said substances into a pumpable fluid form, thereafter continuously introducing it in the form of droplets into a body of a non-aqueous solvent for the constituents to be extracted, said solvent being capable of forming an azeotrope with water, said azeotrope boiling below 100° C. under the conditions of operation, maintaining said body of solvent in boiling condition at all times, removing the azeotrope formed, thereby simultaneously drying said substance and extracting said constituents, recovering the dried powder and recovering the extracted constituents from the solvent, the temperature being maintained at all times below 100° C.

14. In a process for drying and defatting a biological substance which comprises simultaneously defatting and drying by azeotropic distillation of water from said substance, using a water-immiscible fat solvent, and maintaining a temperature below 100° C., the improvement which comprises homogenizing said substance, emulsifying it with a water-immiscible fat solvent to form a fluid pumpable emulsion, then introducing said emulsion in the form of droplets into a boiling body of said solvent, removing the water from said substance in the form of an azeotrope with said solvent, and recovering the dry, defatted substance.

15. In a process for drying and defatting a biological substance which comprises simultaneously defatting and drying by azeotropic distillation of water from said substance, using a water immiscible fat solvent, and maintaining a temperature below 100° C., the improvement comprising converting said substance into fluid pumpable form, then injecting said fluid pumpable substance in the form of droplets into a boiling body of said solvent, removing the water from said substance in the form of an azeotrope with said solvent, continuously withdrawing the dry, defatted substance and fat-enriched solvent from the body of boiling solvent and continuously adding additional solvent to replace the withdrawn solvent as well as that removed during the azeotropic distillation.

16. In a process for drying and defatting a biological substance which comprises simultaneously defatting and drying by azeotropic distillation of water from said substance, using a water immiscible fat solvent, and maintaining a temperature below 100° C., the improvement comprising converting said substance into fluid pumpable form, then injecting said fluid substance into a boiling body of said solvent to form droplets of said fluid substance therein, removing the water from said substance in the form of an azeotrope with said solvent, and recovering the dry, defatted substance.

17. A process for drying a biological substance which comprises converting said substance into a pumpable fluid form, thereafter continuously injecting it into a boiling body of an azeotrope former in a distillation zone, thereby converting the fluid substance into droplets, removing the azeotrope formed, and recovering the dried biological substance, the temperature being maintained at all times below 100° C.

18. In a process for simultaneously defatting and drying by azeotropic distillation a coagulable biological substance, using a water-immiscible fat solvent and maintaining the temperature below 100° C., the improvement comprising converting the substance into pumpable form, then introducing it into a body of boiling solvent, thereby dispersing it in the boiling solvent and coagulating the substance so that the dispersed particles do not agglomerate, removing the water from said substance in the form of an azeotrope with the solvent, and recovering the dry defatted substance.

19. The process of claim 18 wherein the substance is first mixed with solvent before being introduced into the boiling body of solvent.

20. A process for drying and defatting a biological substance which comprises forming a pumpable emulsion of said substance with a water-immiscible fat solvent capable of forming an azeotrope with water boiling below 100° C. and thereafter removing the water from said substance by azeotropic distillation while simultaneously extracting fat therefrom, and recovering the dry defatted substance, the temperature being maintained below 100° C.

21. A process of claim 12 wherein the biological substance is formed into an emulsion with a portion of the azeotrope former, and the droplets are formed by the natural agitation of the boiling liquid.

EZRA LEVIN.

REFERENCES CITED

The following references are of record in the file of this patent:

UNITED STATES PATENTS

| Number | Name | Date |
|---|---|---|
| 1,005,539 | Grotkass et al. | Oct. 10, 1911 |
| 1,934,677 | Ash | Nov. 14, 1933 |
| 2,358,869 | Maurer et al. | Sept. 26, 1944 |
| 2,503,312 | Worsham et al. | Apr. 11, 1950 |
| 2,522,560 | Benard | Sept. 19, 1950 |
| 2,539,544 | Levin et al. | Jan. 30, 1951 |